July 26, 1966  C. W. KAESEMEYER  3,262,300
PROCESS AND TOOL FOR PRECISION SLOT FINISHING
Filed Sept. 10, 1963  2 Sheets-Sheet 1

INVENTOR.
CARL W. KAESEMEYER
BY Howard Keiser
& Jack J. Earl
ATTORNEYS

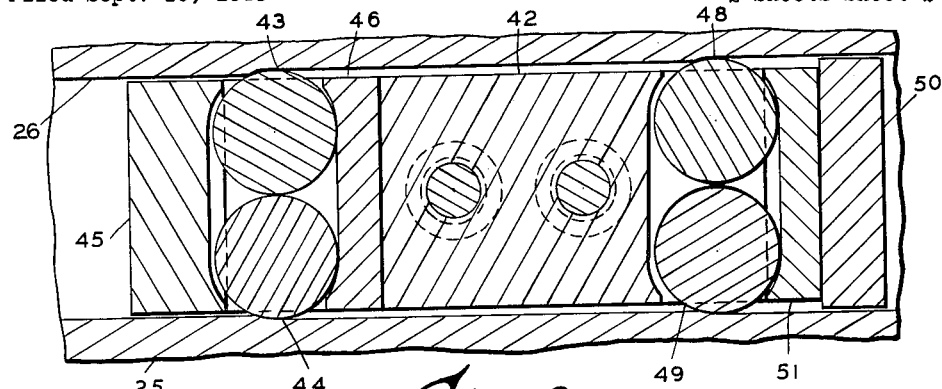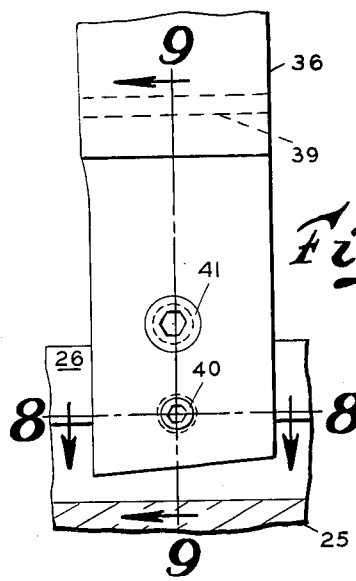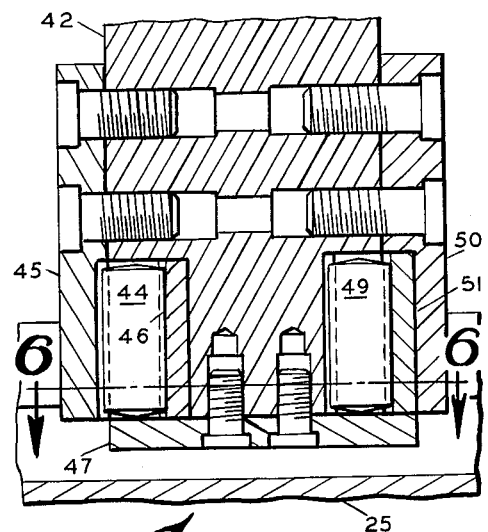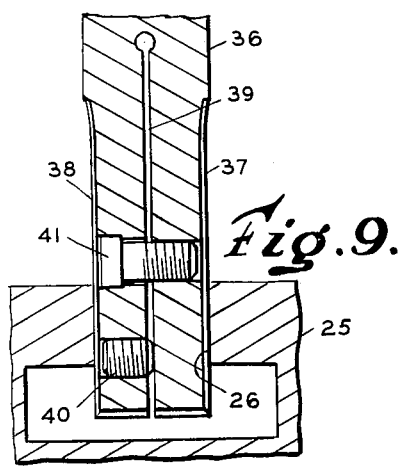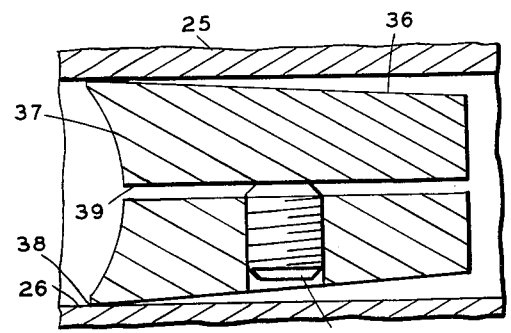

United States Patent Office 3,262,300
Patented July 26, 1966

3,262,300
PROCESS AND TOOL FOR PRECISION
SLOT FINISHING
Carl W. Kaesemeyer, Cincinnati, Ohio, assignor to The
Cincinnati Milling Machine Co., Cincinnati, Ohio, a
corporation of Ohio
Filed Sept. 10, 1963, Ser. No. 308,004
5 Claims. (Cl. 72—203)

This invention relates to a process for precision finishing the sides of a slot in a workpiece and to the tool used in the process to accurately and smoothly finish the slot.

The long precision T-slots in a large milling machine table are normally produced by a process employing a planing machine. The final step in the process is a burnishing pass to improve the surface finish and to finally size the stem portion of the T-slot. The burnishing step in the operation is performed by rubbing a burnishing tool along each side of the stem portion of the slot. As this is a friction finishing operation, the pressures between the tool and slot are usually quite high and lubrication sometimes fails due to this pressure and also due to the heat generated at the tool. When this happens, it often results in metal from the slot side "freezing" to the tool which then causes the tool to roughly smear the slot rather than to smoothly finish it. Since the final size of the slot is critical and the slot is approximately to size before burnishing, there can be no subsequent cleanup of the slot by widening after it has been smeared. The entire workpiece is then scrap. This is a manufacturing problem that can be appreciated when, for example, a solid steel table of dimensions in the order of eight feet by twenty or more feet planed complete for assembly except for burnishing of the T-slots is ruined during the burnishing step of the slotting process. A workpiece of this nature at the burnishing operation is a very valuable thing having a direct cost in the usual case of several thousands of dollars.

It is therefore an object of this invention to provide an improved final finishing operation for slots in a workpiece to eliminate the hazards of burnishing and to improve the size and finish capabilities beyond those obtainable by burnishing.

It is also an object of this invention to provide a tool for the final finishing operation which will provide a low friction mechanism for smoothly finishing the opposite sides of a slot simultaneously in a planing machine operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, the process of this invention includes a cleaning pass through the rough planed slot by which the opposite sides are lightly scraped to remove loose chips and dirt before the final finishing pass. The final pass is made then with a rolling tool which is comprised of two adjacent rollers having a combined width slightly greater than the rough slot. The rollers engage the slot on each side and bear against one another. As the tool is moved along the slot, the rollers roll against one another and each rolls along its respective slot side under sufficient pressure to smoothly finish the slot.

A clear understanding of the process and the construction and use of the rolling tool of this invention can be obtained from the following detailed description in which reference is made to the attached drawings wherein:

FIG. 5 is a longitudinal section view of an alternate form of the rolling tool of this invention.

FIG. 6 is a section view of the tool of FIG. 5 on line 6—6 thereof.

FIG. 7 is a side elevation of a scraping tool used in the slot cleaning step of the process of this invention.

FIG. 8 is a section view of the scraping tool of FIG. 7 on line 8—8 thereof.

FIG. 9 is also a section view of the tool of FIG. 7 on line 9—9 thereof.

Figure 1:
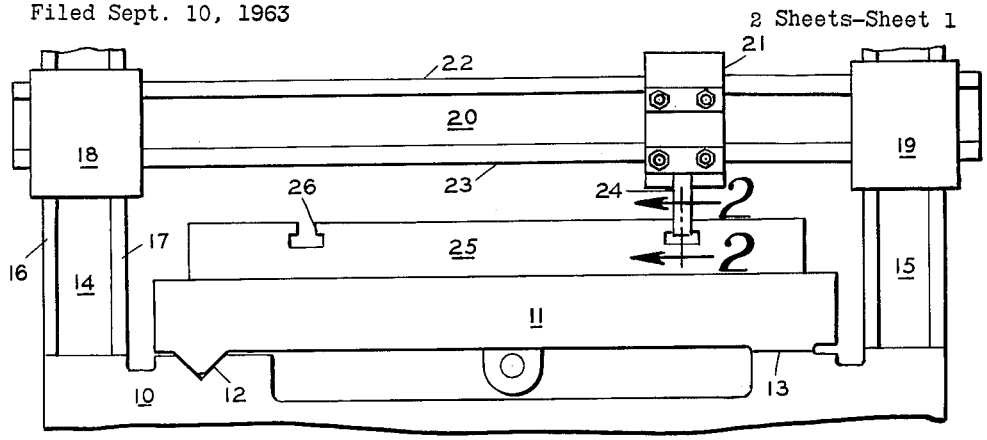
FIG. 1 is a simplified end view of a planing machine.

A planing machine of the type for which FIG. 1 is representative includes a bed 10 on which a worktable 11 is slidably movable along parallel longitudinal ways 12, 13. A pair of vertical columns 14, 15 rise on either side of the worktable 11 at a fixed location on the bed 10. Each of the columns has a pair of ways 16, 17 on which a vertical slide member 18, 19 is received for movement therealong. A beam 20 is received between the slides 18, 19 and it supports a tool carrier 21 that is movable between the slides 16, 17 on ways 22, 23 formed along the beam 20. The tool carrier 21 is adapted to fixedly hold a planing tool 24 in a depending fashion such that it engages with a workpiece 25 supported on and moved reciprocally with the work table 11. The workpiece 25 is a worktable for a machine to be built and has in its top surface T-slots 26 the opposed sides of the stem portion of which are to be finished smoothly and with an accurate dimension therebetween.

Figure 3:
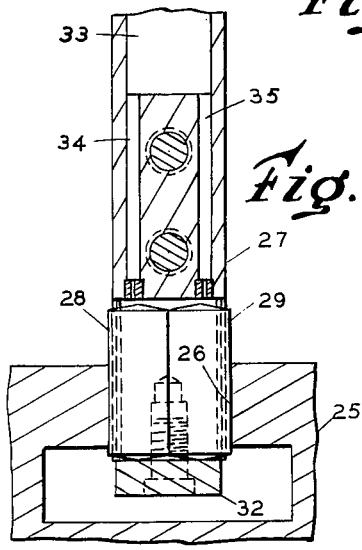
FIG. 3 is a section view of the tool of FIG. 2 on line 3—3 thereof.
Figure 2:
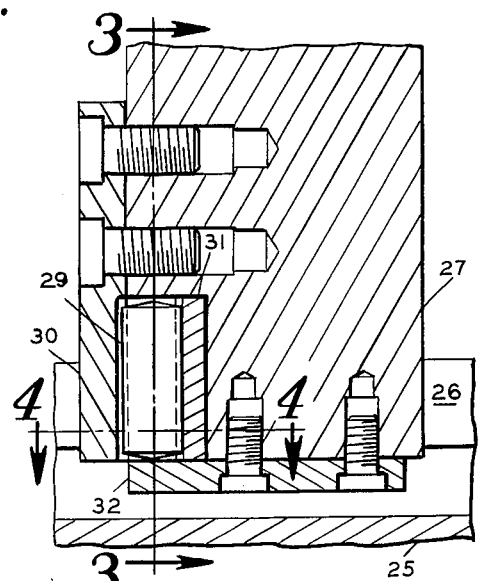
FIG. 2 is a longitudinal section view of one form of rolling tool of this invention as viewed from line 2—2 of FIG. 1.
Figure 4:
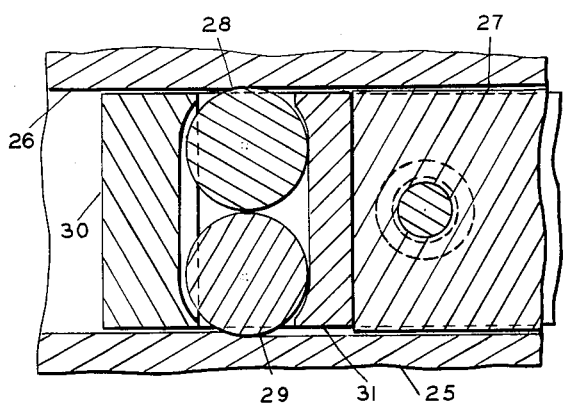
FIG. 4 is a section view of the tool of FIG. 2 on line 4—4 thereof.

A final slot side finishing tool constructed in accordance with this invention is shown in FIGS. 2, 3 and 4. The tool is comprised of a body 27 in which a pair of very hard rollers 28, 29 are loosely held in side by side relationship between a front retainer 30 and a bearing pad 31 and above a bottom retainer 32. As shown, the tool is adapted for insertion into the T-slot 26 such that the structure of the tool, except for the rollers 28, 29 clears the surfaces of the rough machined slot 26. The rollers 28, 29 are in contact with the opposed sides of the stem portion of the T-slot 26 and are in contact with one another. As viewed in FIG. 4, the rollers 28, 29 are shown to have a combined width slightly greater than the rough machined slot 26 shown to the left of the rollers 28, 29. As the tool body 27 is relatively moved to the left through the slot 26 by a shift of the workpiece 25 to the right, the rollers are squeezed together and roll in contact with the sides of the slot 26 and on one another. High contact pressures are created between the rollers 28, 29 and the sides of the slot 26 which produce a roll forming of those sides such that the area traversed by the rollers 28, 29 is smoothly finished and the space between the sides is slightly widened to the final dimensional size. Since the rollers 28, 29 are freely movable laterally a limited amount, as shown in FIG. 4, the forces reacting on each of the rollers 28, 29 at their extremities which are in contact with the sides of the slot are equal even though the tool body 27 may be slightly off the centerline of the slot 26. After the rolling operation, the centerline of the slot 26 is in the same location, as it was before the widening of the slot having thus been performed with an equal deformation on each of the slot sides. The force pushing the rollers 28, 29 through the slot 26 is transmitted to them from the bearing pad 31 and therefore the tool body 27 contains an oil reservoir 33 from which oil is allowed to drip onto the rollers 28, 29 through restricted passageways 34, 35, FIG. 3, to reduce the rubbing friction between the rollers 28, 29 and the bearing pad 31. The oil from the reservoir 33 also lubricates the metal forming operation.

Since the tool described performs a metal rolling operation to finish the slot 26, it is necessary that the rough slot surfaces prior to the rolling be clean and free of dirt and chips or otherwise the dirt and chips would be pressed into the slot sides and produce a defect in the slot surface. Therefore the rolling tool described is used subsequent to a cleaning operation which removes the chips and dirt from the sides of the slot 26. The cleaning is performed by a scraper tool 36 shown in FIGS. 7, 8 and 9. The tool 36 is adapted for receipt in the tool carrier 21 to depend into the rough planed slot 26 with each of a pair of scraping edges 37, 38 in contact with the opposite sides of the stem portion of the T-slot 26. As shown, the tool is relieved away from the cutting edges 37, 38 to form a clearance behind those edges. The scraping tool 36 is adjustable to exactly fit into the slot 26 so that it bears only lightly against each side thereof for scraping. The adjustment is provided by a slot 39 extending centrally and longitudinally into the tool 36 at the portion which extends into the workpiece slot 26. The spacing of the cutting edges 37, 38 is dependent upon the adjustment of a screw 40 tending to force the scraper tool slot 39 open and a screw 41 which tends to pull the slot 39 closed when tightened. The two screws 40, 41 can then be relatively adjusted to flex the lower portions of the tool to appropriately space the edges 37, 38 for light contact with the opposite sides of the workpiece slot 26 and they will maintain the tool in the adjusted condition. The tool 36 performs no appreciable metal removal as it is passed through the slot 26, it being intended merely to remove chips and dirt that might otherwise be left on the sides of the slot 26 by the rough planing operation by which the rough slot 26 is produced initially.

In some materials, rolling of a surface causes work-hardening to occur and in some instances this is desirable in slots of a machine worktable such as the workpiece 25 described. This is best accomplished by several rolling passes and therefore an alternate form of a tool is shown in FIGS. 5 and 6. The tool is comprised of a body 42 in which a leading pair of rollers 43, 44 are held between a retainer 45 and bearing pad 46 above a retainer 47 in a manner similar to that in which the rollers 37, 38 are held. These rollers 43, 44 have a combined lateral width slightly wider than the width of the stem portion of the rough slot 26 and perform the same operation as the previously described rollers 37, 38. In this alternate tool, however, a second pair of rollers 48, 49 is held above the member 47 at the rear of the body 42 by a retainer member 50 secured to the body and including a bearing pad 51 brazed to the retainer 50. These trailing rollers 48, 49 have a combined dimensional width slightly larger than the combination of the other pair of rollers 43, 44 and consequently they further roll the slot surfaces in a second rolling operation to increase the work hardening effect of the finishing process. It should be pointed out that additional pairs of rollers could also be included in one tool body for increased work hardening, each of the pairs having a slightly greater combined width than the preceding pair. Multiple sets of rollers as described is a practical form of tool since the force required to move the rolling tool through the slot is surprisingly low in proportion to the pressures exerted on the walls of the slot 26. As in the single roller tool described, the rollers 43, 44 and 48, 49 are laterally movable in the body 42 to equalize the pressure on the walls of the slot 26 despite slight off-centering of the tool body 42 in the slot.

In an application of the combined scraper cleaning and roller finishing operation of this invention with tools as described with reference to FIGS. 2, 3 and 4 and FIGS. 7, 8 and 9, rough slots in a steel table having a width of .808 to .810 inch and the sides having a surface roughness of approximately 200 microinches R.M.S. were finished with a single roller pass to a width of .812 inch and a surface roughness of only 8 microinches R.M.S. It can be seen also, that any width of slot having parallel sides can be finished by the process and tooling described within reasonable extremes, the limiting factors on the smaller sizes being the available size of rollers and a tool body to hold them. It is also possible to roll finish slots of other than T-slot section by simple modifications of the tools described. For example, the rollers in the tool can be supported from their upper ends by appropriate necks and mating flanges rather than from their lower ends to provide a roller tool for finishing the sides of a slot having a rectangular cross section.

What is claimed is:
1. The process of producing a precision slot from a rough planed slot in a metal workpiece comprising the steps:
(a) passing a scraper tool through the rough slot to clean the sides thereof, and
(b) passing a tool therethrough having rollers in forcible contact simultaneously with the opposed sides of the cleaned rough slot to roll finish the sides thereof to final size and smoothness.

2. The process of claim 1 wherein the rollers in the last recited step contact the opposite sides of the slot with equal pressure.

3. A tool for simultaneously finishing the opposed sides of a slot in a workpiece when forcefully passed therethrough comprising:
(a) a body adapted to pass loosely through the workpiece slot and
(b) a pair of cyindrical rollers rotatably received in said body in parallel and adjacent relationship,
(1) said rollers each having a peripheral portion projecting from a side of said body to contact a side of the slot,
(2) the dimensional width of the rollers measured between the peripheral extremities thereof on opposite sides of said body being a predetermined amount greater than the width of the slot prior to the passage of said rollers therethrough.

4. The tool of claim 3 wherein said rollers are adapted to contact and roll on one another and are freely shiftable laterally in said body a limited amount.

5. The tool of claim 4 wherein a plurality of said pairs of rollers are stationed successively along said body, the dimensional widths of said pairs increasing slightly from one pair to the next pair.

References Cited by the Examiner

UNITED STATES PATENTS

| 358,629 | 3/1897 | Simonds | 72—464 |
|---|---|---|---|
| 950,036 | 2/1910 | York | 72—207 |
| 1,513,565 | 10/1924 | Somersall | 72—208 |
| 1,607,445 | 11/1926 | Coyle | 72—203 |
| 3,194,044 | 7/1965 | Polakowski et al. | 72—204 |

FOREIGN PATENTS 1,072,949  1/1960  Germany.

CHARLES W. LANHAM, *Primary Examiner.*

W. H. JUST, *Assistant Examiner.*